United States Patent
Sun et al.

(10) Patent No.: US 11,360,684 B2
(45) Date of Patent: Jun. 14, 2022

(54) DATA STORAGE METHOD AND APPARATUS, STORAGE MEDIUM AND COMPUTER DEVICE

(71) Applicant: PING AN TECHNOLOGY (SHENZHEN) CO., LTD., Guangdong (CN)

(72) Inventors: Cheng Sun, Guangdong (CN); Junfeng Ye, Guangdong (CN); Yunhui Lai, Guangdong (CN); Xianxian Luo, Guangdong (CN); Juegang Long, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 9 days.

(21) Appl. No.: 17/264,321

(22) PCT Filed: Oct. 21, 2018

(86) PCT No.: PCT/CN2018/111121
§ 371 (c)(1),
(2) Date: Jan. 29, 2021

(87) PCT Pub. No.: WO2020/024446
PCT Pub. Date: Feb. 6, 2020

(65) Prior Publication Data
US 2021/0294512 A1    Sep. 23, 2021

(30) Foreign Application Priority Data
Aug. 1, 2018    (CN) .......................... 201810865641.1

(51) Int. Cl.
*G06F 3/06* (2006.01)

(52) U.S. Cl.
CPC .......... *G06F 3/0644* (2013.01); *G06F 3/0611* (2013.01); *G06F 3/0673* (2013.01)

(58) Field of Classification Search
CPC .... G06F 3/0644; G06F 3/0611; G06F 3/0673; G06F 16/22; G06F 16/24
See application file for complete search history.

(56) References Cited

U.S. PATENT DOCUMENTS 3,587,062 A * 6/1971 Jen .......................... G06F 3/153
 365/73
4,064,556 A * 12/1977 Edelberg ................. G06F 7/22
 711/110
(Continued)

FOREIGN PATENT DOCUMENTS

CN    102930004 A * 2/2013

*Primary Examiner* — Ramon A. Mercado

(57) ABSTRACT

A data storage method includes: acquiring target data to be stored, and classifying refresh rates of the target data to be stored according to a front-end system; subjecting the target data to be stored with high refresh rates as classified and the target data to be stored with low refresh rates as classified to a Hash calculation to obtain a first type Hash value and a second type Hash value; determining storage data segments corresponding to the first type Hash value and the second type Hash value according to a preset storage data segment determination relationship, and storing the target data to be stored with high refresh rates and the target data to be stored with low refresh rates into the storage data segments corresponding to the first type Hash value and the second type Hash value, respectively.

13 Claims, 5 Drawing Sheets

(56) References Cited

U.S. PATENT DOCUMENTS

| | | | | |
|---|---|---|---|---|
| 4,236,174 | A | * | 11/1980 | Gall ..................... H04N 1/622 |
| | | | | 358/518 |
| 4,999,815 | A | * | 3/1991 | Barth, Jr. ................. G11C 8/10 |
| | | | | 365/230.01 |
| 2012/0016845 | A1 | * | 1/2012 | Bates .................. G06F 16/1727 |
| | | | | 707/E17.005 |
| 2014/0006362 | A1 | * | 1/2014 | Noronha ............ G06F 16/2255 |
| | | | | 707/E17.002 |
| 2017/0062073 | A1 | * | 3/2017 | Backsen .............. G11C 29/023 |
| 2021/0294512 | A1 | * | 9/2021 | Sun ......................... G06F 16/22 |
| 2022/0051744 | A1 | * | 2/2022 | Huang .................. G11C 29/52 |
| 2022/0093600 | A1 | * | 3/2022 | Onuki ................ H01L 27/1225 |

\* cited by examiner

DATA STORAGE METHOD AND APPARATUS, STORAGE MEDIUM AND COMPUTER DEVICE

CLAIM OF PRIORITY

This application claims priority to the Chinese Patent No. 201810865641.1, filed on Aug. 1, 2018, titled "Data Storage Method and Apparatus, Storage Medium, and Terminal", which is incorporated herein by reference in its entirety.

TECHNICAL FIELD

This application relates to the technical field of data processing, more particularly, to a data storage method and apparatus, a storage medium and a computer device.

BACKGROUND

The amount of data processed in the advent of the age of big data has turned out to be far beyond people's imagination. Those skilled in the art have developed a load balancing method to distribute data evenly to each node, e.g., the storage of the data, to store the data separately in the corresponding memories and access the data when needed.

At present, in a load balancing method for data storage in the prior art, data are evenly distributed to each storage node for storage through methods such as a data modulus operation, with data divided by the number of nodes, however, all the data has to be stored again upon addition or deletion of nodes, which will affect the progress of the storage of the data and fail to load the original cached data accurately. Moreover, frequent data storage operations may also cause data storage overload.

SUMMARY

In view of the above, this application provides a data storage method and apparatus, a storage medium and a computer device, with a major object to solve the problem in a load balancing method for data storage in the prior art that data are evenly distributed to each storage node for storage through methods such as a data modulus operation, with data divided by the number of nodes.

According to an aspect of this application, a data storage method is provided, including:

acquiring target data to be stored, and classifying refresh rates of the target data to be stored and the target data to be stored according to a front-end system;

subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; and determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

According to another aspect of this application, a data storage apparatus is provided, including:

an acquisition unit for acquiring target data to be stored, and classifying refresh rates of the target data to be stored and the target data to be stored according to a front-end system;

a calculation unit for subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; and a storage unit for determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

According to yet another aspect of this application, a non-volatile readable storage medium having stored therein at least one computer-readable instruction for causing a processor to perform operations corresponding to the above data storage method.

According to still another aspect of this application, a computer device is provided, including: a processor, a memory, a communications interface, and a communications bus, the processor, the memory and the communications interface being communicated with each other through the communications bus;

wherein the memory is used for storing at least one computer-readable instruction, and the computer-readable instruction causes the processor to perform the operations corresponding to the data storage method.

The technical solution provided by the embodiments of this application is advantageous at least in that:

this application provides a data storage method and apparatus, a storage medium and a computer device, the method including: acquiring data to be stored, and classifying refresh rates of the data to be stored according to a front-end system; subjecting the data to be stored with high refresh rates as classified and the data to be stored with low refresh rates as classified to a Hash calculation to obtain a first type Hash value and a second type Hash value; determining storage data segments corresponding to the first type Hash value and the second type Hash value according to a preset storage data segment determination relationship, and storing the data corresponding to the first type Hash value and the second type Hash value into the determined storage data segments, respectively; wherein the preset storage data segment determination relationship is a storage correspondence of the first type Hash value and the second type Hash value to the storage data segments, respectively. Compared with the load balancing method for data storage in the prior art that data are evenly distributed to each storage node for storage through methods such as a data modulus operation, with data divided by the number of nodes, in the embodiments of this application, the data are subjected the Hash calculation according to the refresh rate of the front-end system, and the data corresponding to the determined first and second type Hash values are stored into storage data segments according to the preset data segment determination relationship, as such, upon addition or deletion of storage locations, the storage locations can be calculated according to the method in the embodiments of this application, the data segments available for the data to be stored are directly calculated, without storing and loading all the data, thereby improving the data storage efficiency.

The above description is merely an overview of the technical solution of this application and, in order that the technical means of this application may be more clearly understood, and enforceable in accordance with the disclosure of the description, and that the above and other objects, features and advantages of this application may be more apparent, embodiments of this application are provided below.

BRIEF DESCRIPTION OF THE ACCOMPANYING DRAWINGS

Those of ordinary skill in the art will readily perceive various other advantages and benefits upon reading the following detailed description of the preferred embodiments. The drawings are intended only to illustrate the preferred embodiments and are not to be construed as limiting this application. Also, throughout the drawings, like reference numerals designate like parts. In the drawings.

DETAILED DESCRIPTION OF ILLUSTRATED EMBODIMENTS

Figure 1:
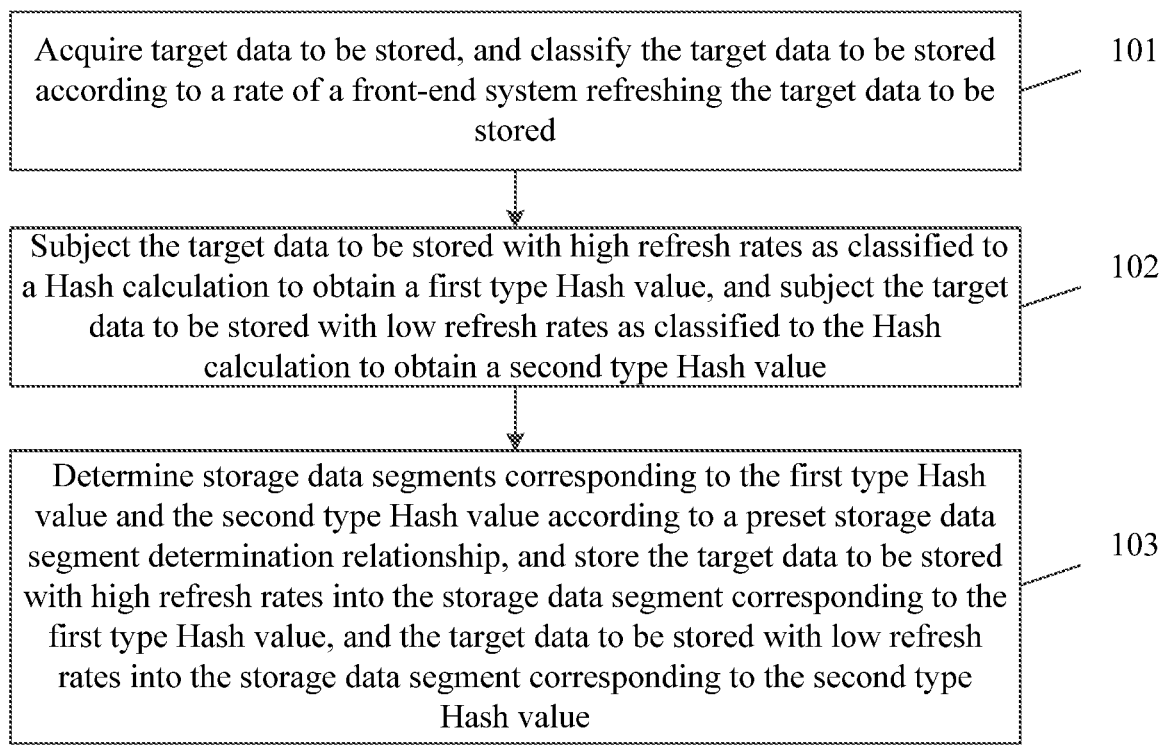
FIG. 1 is a flowchart illustrating a data storage method provided by an embodiment of this application.

Exemplary embodiments of this disclosure will be described in more detail below with reference to the accompanying drawings. While exemplary embodiments of this disclosure are shown in the drawings, it is to be understood that this disclosure may be embodied in various forms and should not be limited to the embodiments set forth herein. Rather, these embodiments are provided so that this disclosure will be thorough and complete, and will fully convey the scope of the disclosure to those skilled in the art.

The embodiments of this application provides a data storage method, shown in FIG. 1, including the following steps.

101. Target data to be stored is acquired, and refresh rates of the target data to be stored and the target data to be stored are classified according to a front-end system.

Herein, the target data to be stored can be letters, numbers, pictures and special characters. In order to evenly distribute different data into different memories for data processing, in the embodiments of this application, when a data storage or data processing request is received by a system background, the data to be stored are acquired, and after the data are stored in the memories, the system background can process on the basis of the data.

102. The target data to be stored with high refresh rates as classified are subjected to a Hash calculation to obtain a first type Hash value, and the target data to be stored with low refresh rates as classified are subjected to the Hash calculation to obtain a second type Hash value.

Herein, the Hash value is calculated for each datum to be stored, the Hash value calculated on the basis of the data with the high refresh rate as classified in step 101 is determined to be the first type Hash value, and the Hash value calculated on the basis of the data with the low refresh rate as classified is determined to be the second type Hash value.

It should be noted that in the embodiments of this application, the Hash value is a hashed value calculated using a Hash algorithm that transformed an input of any length into an output of fixed length, the output being the hashed value, i.e., the Hash value in the embodiments of this application.

In addition, the rate of the front-end system to refresh the data is a rate at which the data is acquired by the front-end system, and the refresh rates of the data are classified as fast speed and slow, and how the rates are classified can be determined according to the volume of the data acquired by the front-end system within a preset timeframe, specifically, the target data to be stored with high refresh rates are defined as data stored by the front-end system in a volume larger than the preset threshold in a preset timeframe, and the target data to be stored with low refresh rates are defined as data stored by the front-end system in a volume smaller than or equal to the preset threshold in the preset timeframe. Herein, the preset threshold is used for limiting the volume of the data acquired within the preset timeframe and can be 10,000, 100,000 and the like, which is not limited specifically by the embodiments of this application. For example, if the data acquired by the front-end system 1 within one hour is 100,000, the data acquired by the front-end system 2 within one hour is 100,000, and the preset threshold is 50,000, then the data acquired by the front-end system 1 are classified as the data with slow refresh rates, and the data acquired by the front-end data 2 are classified as the data with high refresh rates, which is not limited specifically by the embodiments of this application.

103. Storage data segments corresponding to the first type Hash value and the second type Hash value are determined according to a preset storage data segment determination relationship, the target data to be stored with high refresh rates are stored into the storage data segment corresponding to the first type Hash value, and the target data to be stored with low refresh rates are stored into the storage data segment corresponding to the second type Hash value.

Herein, the preset storage data segment determination relationship is a storage correspondence of the first type Hash value and the second type Hash value to the storage data segments, respectively. In the embodiments of this application, a division of different storage data segments can be provided in different memories, and the storage correspondence includes a situation that the first type Hash value is stored in locations of different storage data segments in different memories, and that the second type Hash value is stored in locations of different storage data segments in different memories. The storage data segment includes the volume of the data that can be stored, as well as the location in memory where the data are stored. For example, memory a may include three storage data segments, wherein the first segment may store 10,000 data, the second segment may store 50,000 data, the third segment may store 150,000 data; memory b may include two data storage segments, wherein the first segment may store 20,000 data, and the second segment may store 100,000 data. As calculated according to the storage correspondence of the first type Hash value and the second type Hash value to the data storage segment, data corresponding to the first type Hash values 150, 110 and 200 are stored into the second data segment in memory a, data corresponding to the first type Hash values 250, 300 and 310 are stored into the second storage data segment in memory b, and so on, which is not limited by the embodiments of this application.

It is to be noted that in the embodiments of this application, according to the storage correspondence of the first type Hash value and the second type Hash value to the storage data segment, the data corresponding to specific Hash values can be distributed to corresponding storage segments, for example, the data corresponding to the Hash values between 100 and 200 are stored in the storage data segments having relatively a small volume of data stored therein, which is not specifically limited by the embodiments of this application.

This application provides a data storage method, compared with the load balancing method for data storage in the prior art that data are evenly distributed to each storage node for storage through methods such as a data modulus operation, with data divided by the number of nodes, in the embodiments of this application, the data are subjected the Hash calculation according to the refresh rate of the front-end system, and the data corresponding to the determined first and second type Hash values are stored into storage data segments according to the preset data segment determination relationship, as such, upon addition or deletion of storage locations, the storage locations can be calculated according to the method in the embodiments of this application, the data segments available for the data to be stored are directly calculated, without storing and loading all the data, thereby improving the data storage efficiency.

Figure 2:
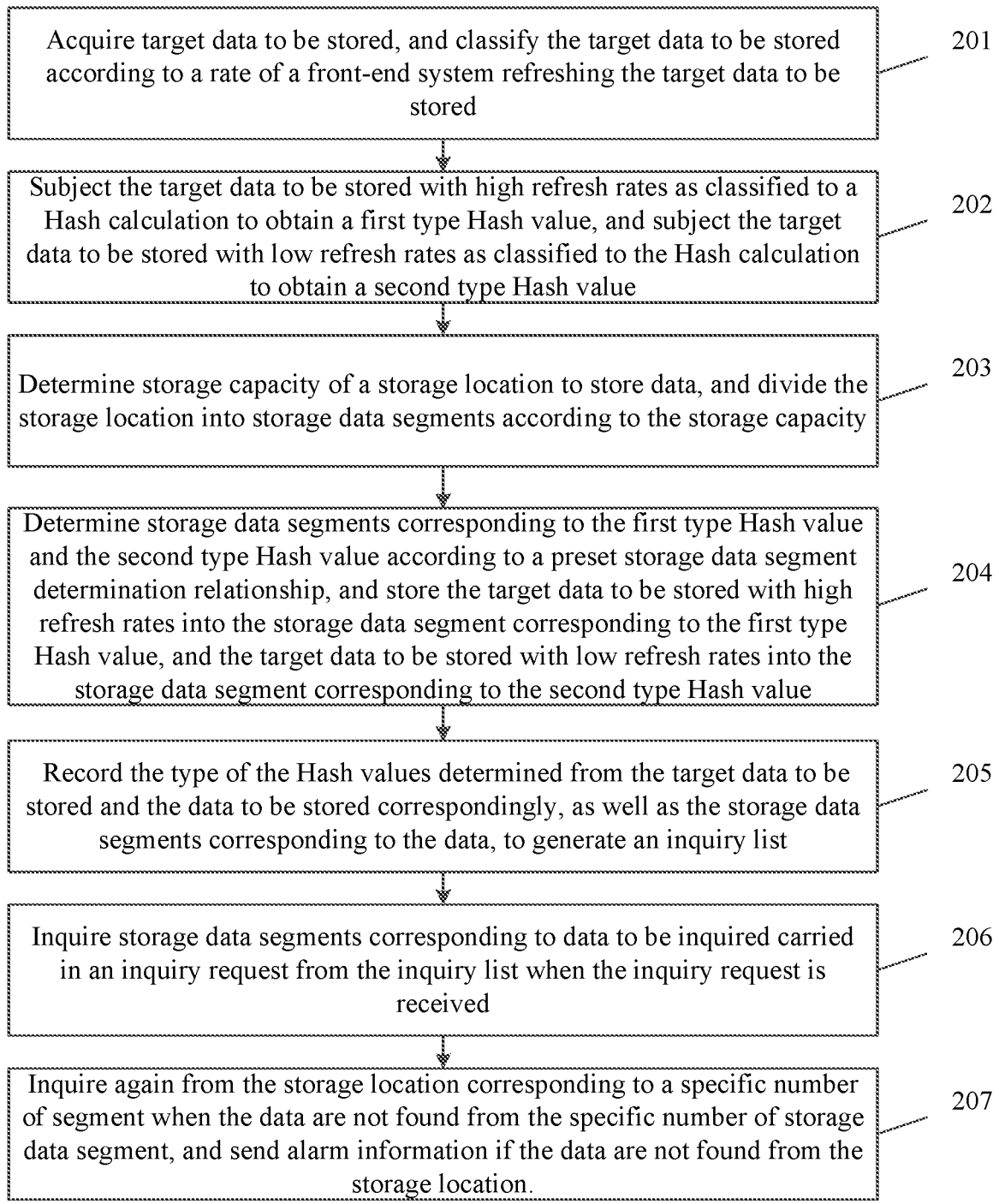
FIG. 2 is a flowchart illustrating another data storage method provided by an embodiment of this application.

The embodiments of this application provide another data storage method, shown in FIG. 2, including the following steps.

201. Target data to be stored is acquired, and refresh rates of the target data to be stored and the target data to be stored are classified according to a front-end system.

This step is the same as step 101 shown in FIG. 1 and will not be described in detail herein.

For the embodiments of this application, before step 201, the method further includes: assessing whether a number of the data to be stored is greater than a preset storage threshold, and classifying the data to be stored into batches if it is assessed that the number of the data to be stored is greater than the preset storage threshold, and sequentially determining the data to be stored of each batch as the target data to be stored according to the batches.

For the embodiments of this application, in order to avoid overload due to a too large volume of data when the data are stored, it is necessary to assess the number of data to be stored before performing step 201 in the embodiments of this application. Herein, the preset storage threshold is set according to the capacity of the current system for storing data, and the capacity for storing data is the maximum volume of data that can be processed by the current system for once. For example, the maximum volume of data that can be processed by the current system for once is 1000,000 data, the preset storage threshold is 900,000, when the number of the data to be stored is 1500,000, which is more than the preset storage threshold, i.e., 900,000, the 1500,000 data are divided, for example, into two batches, each batch having 750,000 data to be acquired, or into 3 batches, each batch having 500,000 data to be acquired, which is not specifically limited by the embodiments of this application.

202. The target data to be stored with high refresh rates as classified are subjected to a Hash calculation to obtain a first type Hash value, and the target data to be stored with low refresh rates as classified are subjected to the Hash calculation to obtain a second type Hash value.

This step is the same as step 102 shown in FIG. 1 and will not be described in detail herein.

203. Storage capacity of storage locations to store data is determined, and the storage locations are divided into storage data segments according to the storage capacity.

For the embodiments of this application, in order to divide storage locations with different storage capacities into different storage data segments, it is necessary to analyze the storage capacities of the storage locations. The storage locations in the embodiments of this application are memories with different storage capacities, and the storage capacity includes the volume of stored data, a response of the system when the data are inquired, and configurations of hardware and software of the storage location. Herein, according to different storage capacities in the embodiments of this application, the storage locations can be divided into different numbers of storage data segments, for example, in the case of a storage capacity including a large volume of storage data, quick response of the system when the data are inquired, and new hardware and software configuration, the storage locations can store a large volume of data and can also be divided into as many storage data segments as possible, e.g., into five storage data segments, each storing 500,000 data, and the like. A different number of segments is also possible, which is not specifically limited by the embodiments of this application.

204. Storage data segments are determined corresponding to the first type Hash value and the second type Hash value according to a preset storage data segment determination relationship, the target data to be stored with high refresh rates are stored into the storage data segment corresponding to the first type Hash value, and the target data to be stored with low refresh rates are stored into the storage data segment corresponding to the second type Hash value.

This step is the same as step 102 shown in FIG. 1 and will not be described in detail herein.

For the embodiments of this application, step 204 may include sub-steps of: substituting the first type Hash value and the second type Hash value into a storage data segment determination formula, and determine storage data segments in storage locations with different storage capacities corresponding to the first type Hash value and the second type Hash value, respectively; determining whether the data to be stored with high refresh rates and the data to be stored with slow refresh rates can be stored in the corresponding storage data segments by using a segmented calculation method; storing the target data to be stored with high refresh rates into the storage data segment corresponding to the first type Hash value, and the target data to be stored with low refresh rates into the storage data segment corresponding to the second type Hash value when it is determined that the target data to be stored can be stored in the corresponding storage data segments.

Herein, the storage data segment determination formula is used for determining whether the first type Hash value and the second type Hash value are stored in the storage data segments. In order to accurately determine the data stored by each specific number of segment in the storage data segments, it is necessary to substitute the first type Hash value and the second type Hash value into the storage data segment determination formula to determine whether the data are stored in the storage data segments. Herein, the storage data segment determination formula is y=x−a, y is a result threshold, x is a parameter representing a number of the storage segments, and a is a substitution of the first type Hash value and the second type Hash value; the data corresponding to the first type Hash value and the second type Hash value are stored in the storage data segments corresponding to the parameter representing the number of storage segments when y is greater than 0; and the data corresponding to the first type Hash value and the second type Hash value are not stored in the storage data segments corresponding to the parameter representing the number of storage segments when y is smaller than or equal to 0. The parameter representing the number of storage segment indicates the number of data which can be stored in different storage data segments, for example, storage location a includes two storage data segments, wherein storage data segment a1 can store 300,000 data, storage data segment a2 can store 1000,000 data; storage location b includes three storage data segments, wherein storage data segment b1 can store 2,000,000 data and storage data segment b2 can store 3,000,000 data, and storage data segment b3 can store 4,000,000 data; the parameter representing the number of storage segment corresponding to each storage data segment is 30, 100, 200, 300 and 400, respectively, and if the first type Hash value is 20, 90 and 110, respectively, the second type Hash value is 180, 220 and 350, respectively, then the above values are substituted into y=x−a, as such, in the case that x=30, 30 minus 20 is greater than 0, 30 minus 90 is less than 0, 30 minus 110 is less than 0, 30 minus 180 is less than 0, 30 minus 220 is less than 0, and 30 minus 350 is less than 0, therefore, the data corresponding to the first type Hash value 20 are not stored in the storage data segments a2, b1, b2, or b3, but in a1; and similarly, the data corresponding to the first type Hash value 90 are stored in the storage data segment a2, the data corresponding to 110 and 180 are stored in the storage data segment b1, the data corresponding to 220 are stored in the storage data segment b2, and the data corresponding to 350 are stored in the storage data segment b3.

205. The type of the Hash values determined from the target data to be stored and the data to be stored is recorded accordingly, as well as the storage data segments corresponding to the data, to generate an inquiry list.

For the embodiments of this application, in order to simplify the step of data inquiry, an inquiry list can be created according to the Hash value type of the stored data and the storage data segments corresponding to the data, so that the data in the corresponding storage data segments can be inquired according to the inquiry content carried in the inquiry request. Herein, the Hash value type is either a first type Hash value or a second type Hash value determined according to the data. For example, the generated inquiry list includes a second type Hash value calculated to be 40 corresponding to a datum q and storage data segment c1; hence, according to the correspondence, storage data segment c1 is inquired from the inquiry list to inquire the datum q.

206. Storage data segments corresponding to data to be inquired carried in an inquiry request are found from the inquiry list when the inquiry request is received.

For the embodiments of this application, in order to improve inquiry efficiency, when an inquiry request is received, a storage data segment corresponding to a datum to be inquired carried in the inquiry request can be searched in the inquiry list, and then the datum is found from the storage data segment.

207. Inquiry is made again from the storage locations corresponding to a specific number of segments when the data are not found from the specific number of storage data segments, and alarm information if the data are not found from the storage locations.

For the embodiments of this application, in order to avoid that the data to be inquired cannot be found in the storage data segment of the specific segment number, the inquiry range may be expanded when the data are not found from the storage data segment of the specific segment number recorded in the inquiry list, and the inquiry is performed again from the storage location of the storage data segment. For example, if the data are not found from storage data segment c1, the inquiry range is expanded to the whole storage data segments in storage location c. If data are not found in this storage location, alarm information is sent so that the user can re-determine the inquiry location according to the alarm information or manually inquire, which is not specifically limited by the embodiments of this application.

This application provides another data storage method, in the embodiments of this application, the data are subjected the Hash calculation according to the refresh rate of the front-end system, and the data corresponding to the determined first and second type Hash values are stored into storage data segments according to the preset data segment determination relationship, as such, upon addition or deletion of storage locations, the storage locations can be calculated according to the method in the embodiments of this application, the data segments available for the data to be stored are directly calculated, without storing and loading all the data, thereby improving the data storage efficiency.

Figure 3:
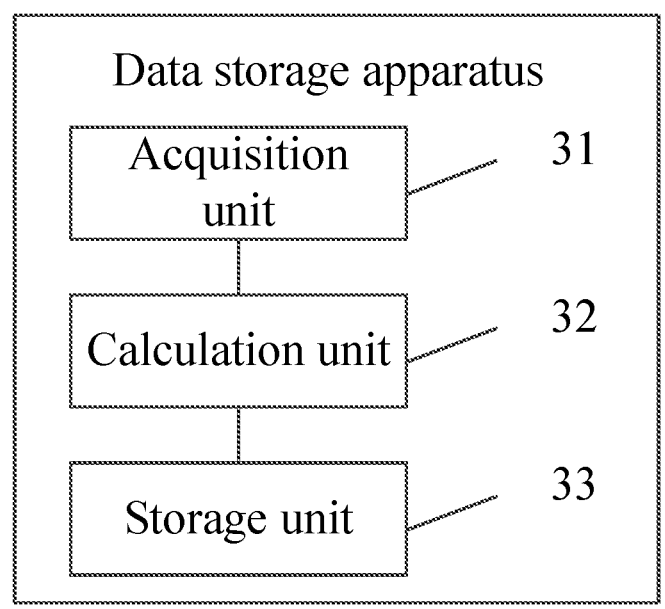
FIG. 3 is a block diagram illustrating a data storage apparatus provided by an embodiment of this application.

Further, as an implementation of the above-described method shown in FIG. 1, the embodiments of this application provide a data storage apparatus, as shown in FIG. 3, including: an acquisition unit 31, a calculation unit 32, and a storage unit 33.

The acquisition unit 31 is used for acquiring target data to be stored, and classifying refresh rates of the target data to be stored and the target data to be stored according to a front-end system; the acquisition unit 31 is a module that acquires the target data to be stored for the data storage apparatus, and classifies the target data to be stored according to the rate of the front-end system to refresh the target data to be stored.

The calculation unit 32 is used for subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; the calculation unit 32 is a module that subjects the target data to be stored with high refresh rates as classified to a Hash calculation to obtain a first type Hash value, and subjects the target data to be stored with low refresh rates as classified to the Hash calculation to obtain a second type Hash value for the data storage apparatus.

The storage unit 33 is used for determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively. The storage unit 33 is a module that determines storage data segments corresponding to the first type Hash value and the second type Hash value according to a preset storage data segment determination relationship, and stores the target data to be stored with high refresh rates into the storage data segment corresponding to the first type Hash value, and the target data to be stored with low refresh rates into the storage data segment corresponding to the second type Hash value for the data storage apparatus.

This application provides a data storage apparatus, in the embodiments of this application, the data are subjected the Hash calculation according to the refresh rate of the front-end system, and the data corresponding to the determined first and second type Hash values are stored into storage data segments according to the preset data segment determination relationship, as such, upon addition or deletion of storage locations, the storage locations can be calculated according to the method in the embodiments of this application, the data segments available for the data to be stored are directly calculated, without storing and loading all the data, thereby improving the data storage efficiency.

Figure 4:
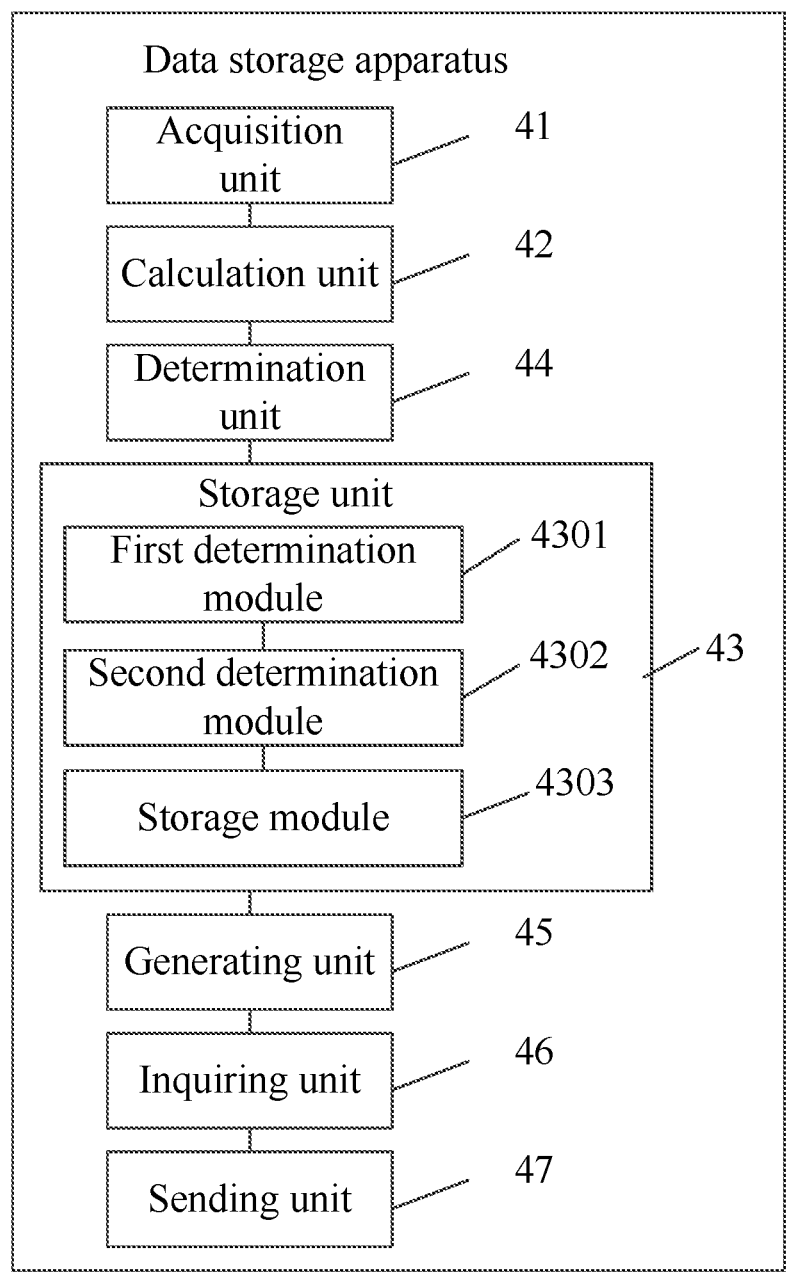
FIG. 4 is a block diagram illustrating another data storage apparatus provided by an embodiment of this application.

Further, as an implementation of the above-described method shown in FIG. 2, the embodiments of this application provide another data storage apparatus, as shown in FIG. 4, including: an acquisition unit 41, a calculation unit 42, a storage unit 43, a determination unit 44, a generating unit 45, an inquiring unit 46, and a sending unit 47.

The acquisition unit 41 is used for acquiring target data to be stored, and classifying refresh rates of the target data to be stored and the target data to be stored according to a front-end system; the calculation unit 42 is used for subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; the storage unit 43 is sued for determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

Further, the apparatus further includes the determination unit 44 for determining storage capacity of storage locations to store data, and dividing the storage locations into storage data segments according to the storage capacity, wherein the storage capacity includes a volume of the data to be stored, a response of the system when the data are inquired, and configurations of hardware and software of the storage location.

Further, the storage unit 43 includes a first determination module 4301 for substituting the first type Hash value and the second type Hash value into a storage data segment determination formula, and determine storage data segments in storage locations with different storage capacities corresponding to the first type Hash value and the second type Hash value, respectively, wherein the storage data segment determination formula is used for determining whether the first type Hash value and the second type Hash value are stored in the storage data segments;

a second determination module 4302 for determining whether the data to be stored with high refresh rates and the data to be stored with slow refresh rates can be stored in the corresponding storage data segments by using a segmented calculation method, wherein the storage data segment determination formula is y=x−a, y is a result threshold, x is a parameter representing a number of the storage segments, and a is a substitution of the first type Hash value and the second type Hash value, the data corresponding to the first type Hash value and the second type Hash value being stored in the storage data segments corresponding to the parameter representing the number of storage segments when y is greater than 0; and a storage module 4303 for storing the target data to be stored with high refresh rates into the storage data segment corresponding to the first type Hash value, and the target data to be stored with low refresh rates into the storage data segment corresponding to the second type Hash value when it is determined that the target data to be stored can be stored in the corresponding storage data segments.

Further, the apparatus further includes the generating unit 45 for recording the type of the Hash values determined from the target data to be stored and the data to be stored, as well as the storage data segments corresponding to the data, to generate an inquiry list. Further, the apparatus further includes the inquiring unit 46 for inquiring storage data segments corresponding to data to be inquired carried in an inquiry request from the inquiry list when the inquiry request is received, so that data are found from the storage data segments. Further, the apparatus further includes the sending unit 47 for inquiring again from the storage locations corresponding to a specific number of segments when the data are not found from the specific number of storage data segments, and sending alarm information if the data are not found from the storage locations. Further, the acquisition unit 41 is further used for assessing whether a number of the data to be stored is greater than a preset storage threshold, and classifying the data to be stored into batches if it is assessed that the number of the data to be stored is greater than the preset storage threshold, and sequentially determining the data to be stored of each batch as the target data to be stored according to the batches.

This application provides another data storage apparatus, in the embodiments of this application, the data are subjected the Hash calculation according to the refresh rate of the front-end system, and the data corresponding to the determined first and second type Hash values are stored into storage data segments according to the preset data segment determination relationship, as such, upon addition or deletion of storage locations, the storage locations can be calculated according to the method in the embodiments of this application, the data segments available for the data to be stored are directly calculated, without storing and loading all the data, thereby improving the data storage efficiency.

An embodiment of this application provides a non-volatile readable storage medium having at least one computer-readable instruction stored therein, the computer-readable instruction can perform the data storage method in any of the method embodiments described above.

Figure 5:
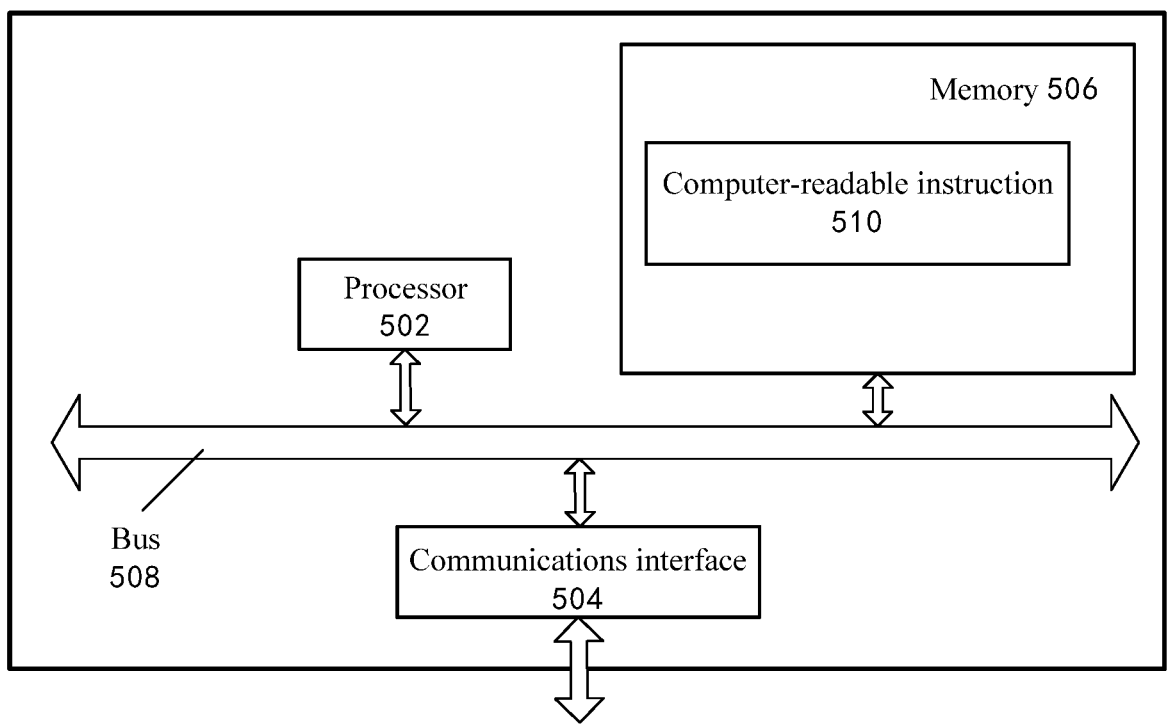
FIG. 5 shows a schematic structural diagram of a computer device provided by an embodiment of this application.

FIG. 5 shows a schematic structural diagram of a computer device provided by an embodiment of this application, the computer device may be a terminal in particular, and the embodiments of this application do not limit the specific implementation of the terminal. As shown in FIG. 5, the terminal may include: a processor 502, a communications interface 504, a memory 506, and a communications bus 508. Herein, the processor 502, the communications interface 504, and the memory 506 are communicated with each other through the communications bus 508. The communications interface 504 is used to communicate with other network elements, such as clients or other servers. The processor 502 is used for performing the computer-readable instruction 510 that, in particular, performing the relevant steps in the embodiments of the data storage method described above. In particular, the computer-readable instruction 510 may include computer-readable instruction code including computer-readable instructions. The processor 502 may be a CPU, or an Application Specific Integrated Circuit (ASIC), or one or more integrated circuits configured to implement the embodiments of this application. One or more processors included in the terminal can be processors of the same type, such as one or more CPUs, or different types of processors, such as one or more CPUs plus one or more ASICs. The memory 506 is used for storing the computer-readable instruction 510. The memory 506 may include a high-speed RAM memory, and may also include a non-volatile memory, for example, at least one disk memory.

Specifically, the computer-readable instruction 510 may be used to cause the processor 502 to: acquire target data to be stored, and classify refresh rates of the target data to be stored and the target data to be stored according to a front-end system; to subject the target data to be stored with high refresh rates as classified to a Hash calculation to obtain a first type Hash value, and subject the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; and to determine storage data segments corresponding to the first type Hash value and the second type Hash value according to a preset storage data segment determination relationship, and store the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

It will be apparent to those skilled in the art that the above-described modules or steps of this application may be implemented using a general-purpose computer, either centralized on a single computer or distributed across a network of computers, or alternatively implemented using computer-readable instruction code executable by the computers, such that the modules or steps may be stored in a memory for execution by a computer, and in some cases, the steps shown or described may be performed in an order other than that herein, or the modules may be separately fabricated as individual integrated circuit modules, or some of the modules or steps may be implemented as a single integrated circuit module. Therefore, this application is not limited to any particular combination of hardware and software.

The foregoing describes merely preferred embodiments of this application and intends not to limit this application, as understood by those skilled in the art, various modifications and changes can be made to this application. Any modifications, equivalents or improvements made without departing the spirit of this application are intended to be included within the scope of this application.

What is claimed is:

1. A data storage method, characterized by comprising:
   acquiring target data to be stored, and classifying refresh rates of the target data to be stored and the target data to be stored according to a front-end system;
   subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; and
   determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

2. The method according to claim 1, characterized in that before determining storage data segments corresponding to the first type Hash value and the second type Hash value according to a preset storage data segment determination relationship, the method further comprises:
   determining storage capacity of storage locations to store data, and dividing the storage locations into storage data segments according to the storage capacity, wherein the storage capacity comprises a volume of the data to be stored, a response of the system when the data are inquired, and configurations of hardware and software of the storage location.

3. The method according to claim 2, characterized in that the step of determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value comprises:

substituting the first type Hash value and the second type Hash value into a storage data segment determination formula, and determine storage data segments in storage locations with different storage capacities corresponding to the first type Hash value and the second type Hash value, respectively, wherein the storage data segment determination formula is used for determining whether the first type Hash value and the second type Hash value are stored in the storage data segments;

determining whether the data to be stored with high refresh rates and the data to be stored with slow refresh rates can be stored in the corresponding storage data segments by using a segmented calculation method, wherein the storage data segment determination formula is $y=x-a$, y is a result threshold, x is a parameter representing a number of the storage segments, and a is a substitution of the first type Hash value and the second type Hash value, the data corresponding to the first type Hash value and the second type Hash value being stored in the storage data segments corresponding to the parameter representing the number of storage segments when y is greater than 0; and storing the target data to be stored with high refresh rates into the storage data segment corresponding to the first type Hash value, and the target data to be stored with low refresh rates into the storage data segment corresponding to the second type Hash value when it is determined that the target data to be stored can be stored in the corresponding storage data segments.

4. The method according to claim 1, characterized by further comprising:

recording the type of the Hash values determined from the target data to be stored and the data to be stored, as well as the storage data segments corresponding to the data, to generate an inquiry list.

5. The method according to claim 4, characterized by further comprising:

inquiring storage data segments corresponding to data to be inquired carried in an inquiry request from the inquiry list when the inquiry request is received, so that data are found from the storage data segments.

6. The method according to claim 5, characterized by further comprising:

inquiring again from the storage locations corresponding to a specific number of segments when the data are not found from the specific number of storage data segments, and sending alarm information if the data are not found from the storage locations.

7. The method according to claim 1, characterized in that before acquiring the target data to be stored, the method further comprises:

assessing whether a number of the data to be stored is greater than a preset storage threshold; and classifying the data to be stored into batches if it is assessed that the number of the data to be stored is greater than the preset storage threshold, and sequentially determining the data to be stored of each batch as the target data to be stored according to the batches.

8. A non-volatile readable storage medium having stored therein at least one computer-readable instruction for causing a processor to perform the data storage method, the method comprising:

acquiring target data to be stored, and classifying refresh rates of the target data to be stored and the target data to be stored according to a front-end system;

subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; and determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

9. The non-volatile readable storage medium according to claim 8, characterized in that before the computer-readable instruction causes the processor to perform the determination of storage data segments corresponding to the first type Hash value and the second type Hash value according to a preset storage data segment determination relationship, the computer-readable instruction causes the processor further to:

determine storage capacity of storage locations to store data, and divide the storage locations into storage data segments according to the storage capacity, wherein the storage capacity comprises a volume of the data to be stored, a response of the system when the data are inquired, and configurations of hardware and software of the storage location.

10. The non-volatile readable storage medium according to claim 9, characterized in that the computer-readable instruction causes the processor to perform the determination of storage data segments corresponding to the first type Hash value and the second type Hash value according to a preset storage data segment determination relationship, and the storage of the target data to be stored with high refresh rates into the storage data segment corresponding to the first type Hash value and the target data to be stored with low refresh rates into the storage data segment corresponding to the second type Hash value, comprising:

substituting the first type Hash value and the second type Hash value into a storage data segment determination formula, and determine storage data segments in storage locations with different storage capacities corresponding to the first type Hash value and the second type Hash value, respectively, wherein the storage data segment determination formula is used for determining whether the first type Hash value and the second type Hash value are stored in the storage data segments;

determining whether the data to be stored with high refresh rates and the data to be stored with slow refresh rates can be stored in the corresponding storage data segments by using a segmented calculation method, wherein the storage data segment determination formula is $y=x-a$, y is a result threshold, x is a parameter representing a number of the storage segments, and a is a substitution of the first type Hash value and the second type Hash value, the data corresponding to the first type Hash value and the second type Hash value being stored in the storage data segments corresponding to the parameter representing the number of storage segments when y is greater than 0; and storing the target data to be stored with high refresh rates into the storage data segment corresponding to the first type Hash value, and the target data to be stored with low refresh rates into the storage data segment corresponding to the second type Hash value when it is determined that the target data to be stored can be stored in the corresponding storage data segments.

11. A computer device comprising a processor, a memory, a communications interface and a communications bus, the processor, the memory and the communications interface being communicated with each other through the communications bus;

the memory is used for storing at least one computer-readable instruction, and the computer-readable instruction causes the processor to perform the data storage method, comprising:

acquiring target data to be stored, and classifying refresh rates of the target data to be stored and the target data to be stored according to a front-end system;

subjecting the target data to be stored with high refresh rates as classified to a Hash calculation to obtain a first type Hash value, and subjecting the target data to be stored with low refresh rates as classified to the Hash calculation to obtain a second type Hash value, wherein the target data to be stored with high refresh rates are defined as data stored by the front-end system in a volume larger than a preset threshold in a preset timeframe, and the target data to be stored with low refresh rates are defined as data stored by the front-end system in a volume smaller than or equal to the preset threshold in the preset timeframe; and determining storage data segments corresponding to the first type Hash value and the second type Hash value according to a preset storage data segment determination relationship, and storing the target data to be stored with high refresh rates into the storage data segment corresponding to the first type Hash value, and the target data to be stored with low refresh rates into the storage data segment corresponding to the second type Hash value, wherein the preset storage data segment determination relationship is a storage correspondence of the first type Hash value and the second type Hash value to the storage data segments, respectively.

12. The computer device according to claim 11, characterized in that before the computer-readable instruction causes the processor to perform the determination of storage data segments corresponding to the first type Hash value and the second type Hash value according to a preset storage data segment determination relationship, the computer-readable instruction causes the processor further to:

determine storage capacity of storage locations to store data, and divide the storage locations into storage data segments according to the storage capacity, wherein the storage capacity comprises a volume of the data to be stored, a response of the system when the data are inquired, and configurations of hardware and software of the storage location.

13. The computer device according to claim 12, characterized in that the computer-readable instructions cause the processor to perform the determination of storage data segments corresponding to the first type Hash value and the second type Hash value according to a preset storage data segment determination relationship, and the storage of the target data to be stored with high refresh rates into the storage data segment corresponding to the first type Hash value and the target data to be stored with low refresh rates into the storage data segment corresponding to the second type Hash value, comprising:

substituting the first type Hash value and the second type Hash value into a storage data segment determination formula, and determine storage data segments in storage locations with different storage capacities corresponding to the first type Hash value and the second type Hash value, respectively, wherein the storage data segment determination formula is used for determining whether the first type Hash value and the second type Hash value are stored in the storage data segments;

determining whether the data to be stored with high refresh rates and the data to be stored with slow refresh rates can be stored in the corresponding storage data segments by using a segmented calculation method, wherein the storage data segment determination formula is $y=x-a$, y is a result threshold, x is a parameter representing a number of the storage segments, and a is a substitution of the first type Hash value and the second type Hash value, the data corresponding to the first type Hash value and the second type Hash value being stored in the storage data segments corresponding to the parameter representing the number of storage segments when y is greater than 0; and storing the target data to be stored with high refresh rates into the storage data segment corresponding to the first type Hash value, and the target data to be stored with low refresh rates into the storage data segment corresponding to the second type Hash value when it is determined that the target data to be stored can be stored in the corresponding storage data segments.

* * * * *